US009280003B2

(12) United States Patent
Anand et al.

(10) Patent No.: US 9,280,003 B2
(45) Date of Patent: Mar. 8, 2016

(54) MULTIMODE FIBER FOR SPATIAL SCANNING

(71) Applicant: The Board of Trustees of the Leland Stanford Junior University, Palo Alto, CA (US)

(72) Inventors: Kristen Judith Boucher Anand, Redwood City, CA (US); Olav Solgaard, Stanford, CA (US); Joseph M. Kahn, San Carlos, CA (US); Catherine Jan, Portland, OR (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 243 days.

(21) Appl. No.: 13/775,943

(22) Filed: Feb. 25, 2013

(65) Prior Publication Data

US 2014/0064654 A1 Mar. 6, 2014

Related U.S. Application Data

(60) Provisional application No. 61/695,593, filed on Aug. 31, 2012.

(51) Int. Cl.
| *G02F 1/035* | (2006.01) |
| *G02F 1/01* | (2006.01) |
| *G02B 21/00* | (2006.01) |
| *G02B 26/10* | (2006.01) |
| *G02B 23/26* | (2006.01) |

(52) U.S. Cl.
CPC .......... *G02F 1/0115* (2013.01); *G02B 21/0032* (2013.01); *G02B 26/103* (2013.01); *G02B 23/26* (2013.01)

(58) Field of Classification Search
CPC ..................................................... G02F 1/0115
See application file for complete search history.

(56) References Cited

U.S. PATENT DOCUMENTS

2011/0137126 A1* 6/2011 French et al. ................. 600/178

OTHER PUBLICATIONS

Di Leonardo et al., "Hologram transmission through multi-mode optical fibers", Jan. 3, 2011, Optics Express, vol. 19, pp. 247-254.*
Mahyalati, et al., "Adaptive control of input field to achieve desired output intensity profile in multimode fiber with random mode coupling", "Optics Express", Jun. 12, 2012, pp. 14321-14337, vol. 20, No. 13, Publisher: OSA , Published in: US.
Roberto Di Leonardo and Silvio Bianchi, "Hologram transmission through multi-mode optical fibers", "Optics Express", Dec. 22, 2010, pp. 247-254, vol. 19, No. 1, Publisher: OSA, Published in: US.
Boucher, et al., "Spot Formation and Scanning Microscopy via Multimode Fibers", "Edward L. Ginzton Laboratory, Stanford University, Stanford CA", 2011, pp. 713-714, Publisher: IEEE 978-1-4244-8939-8/11 , Published in: US.

* cited by examiner

*Primary Examiner* — Hemang Sanghavi
*Assistant Examiner* — Kajli Prince
(74) *Attorney, Agent, or Firm* — Kaplan Breyer Schwarz & Ottesen, LLP

(57) ABSTRACT

A method for imaging a scan region by controlling at least one of the relative phase and relative amplitude of multiple optical modes propagating through a multimode optical fiber to control the position of an output beam emitted from the output facet of the optical fiber is disclosed.

17 Claims, 6 Drawing Sheets

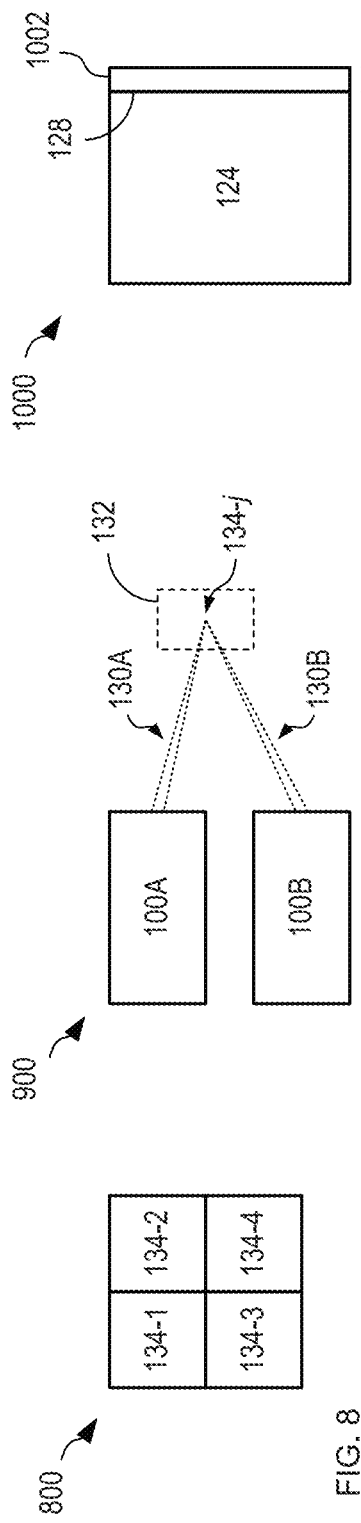
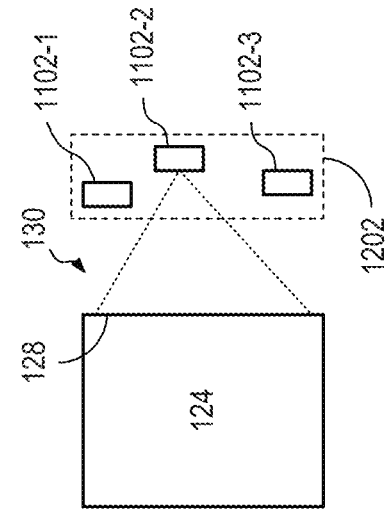
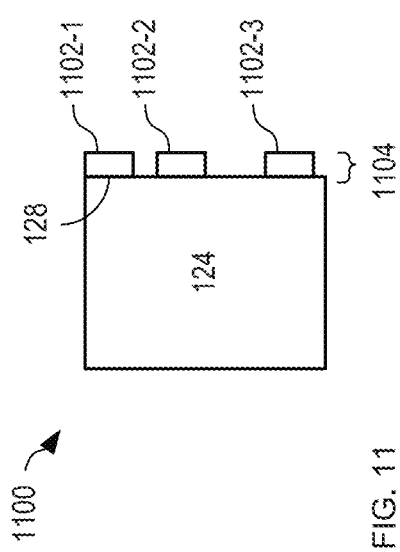
FIG. 8
FIG. 9
FIG. 10
FIG. 11
FIG. 12

MULTIMODE FIBER FOR SPATIAL SCANNING

CROSS REFERENCE TO RELATED APPLICATIONS

This application claims the benefit of U.S. Provisional Application Ser. No. 61/695,593, filed Aug. 31, 2012, entitled "Multimode Fiber for Spatial Scanning,", which is incorporated by reference. If there are any contradictions or inconsistencies in language between this application and the case that has been incorporated by reference that might affect the interpretation of the claims in this case, the claims in this case should be interpreted to be consistent with the language in this case.

STATEMENT REGARDING FEDERALLY SPONSORED RESEARCH

This invention was made with Government support under Grant Number ECCS-1101905 awarded by the National Science Foundation. The Government has certain rights in the invention.

FIELD OF THE INVENTION

The present invention relates to guided-wave optics in general, and, more particularly, to optical beam steering.

BACKGROUND OF THE INVENTION

Optical fibers have become the backbone of terrestrial telecommunications systems, due to their enormous information carrying capacity. An optical fiber is a substantially transparent, flexible pipe, typically about the same diameter as a human hair, which can guide optical energy (i.e., light) along a path. Normally, an optical fiber is made of either glass or plastic.

An optical fiber guides light within a core that is surrounded by a cladding that serves to confine light within the core via a process referred to as "total internal reflection." In other words, as the light travels down the fiber, the interface between the core and the cladding acts like a mirror that reflects light rays back into the core material—even at bends in the optical fiber (subject to some practical limits). As a result, the optical fiber can guide light along a significantly circuitous route with little attenuation of the light.

Optical fibers typically fall into two main categories—single-mode fibers and multimode fibers. In a single-mode fiber, all of the optical energy of a light signal propagating through the fiber travels substantially along a single path down the core of the fiber. As a result, all of the optical energy in the signal travels the same distance and emerges from the output facet of the fiber concentrated in a single spot (i.e., as a single optical mode).

In a multimode fiber, however, optical energy of the light signal can take many different paths (typically hundreds to tens of thousands) down the core of the fiber. The different optical modes supported by the fiber reflect from the core/cladding interface at different angles and, therefore, travel different total distances through the fiber. The different modes can emerge from the output facet of the fiber with slightly different phase, launch angle, and from different locations on the output facet. In telecommunications applications, the disparity between the exit characteristics of the modes conveyed by a multimode optical fiber normally limits their use to short-distance applications, while single-mode fibers are primarily used for long-distance links.

In addition to their use in telecommunications, optical fibers have found utility in medical imaging applications. Conventional confocal microscopes or multiphoton microscopes are limited to imaging biological tissue to depths much less than one millimeter. Optical fiber-based endoscopes, on the other hand, can be inserted directly into a subject, such as an animal or a human, to enable imaging of matter deep within tissue. Endoscopes are widely used to image region within large body cavities, such as the gastrointestinal tract, the respiratory tract, as well as other regions such as brain matter and joint tissue during arthroscopic surgery.

A typical conventional flexible endoscope includes a bundle containing thousands of optical fibers, a high-power light source, and a miniature camera. Some of the fibers in the fiber bundle are used to channel light to the objective end to illuminate the tissue of interest. The remaining fibers in the bundle are used to relay optical images from the sample end to the camera.

More recently, endoscopic imagers have begun incorporating a scanning function, wherein a scanner at the source end is used to illuminate each fiber in the fiber bundle sequentially. This enables the output beam from the fiber bundle to be scanned over a sample area. The reflected light (or fluorescence signal) from the sample is then imaged back through the same fiber core so that a full sample image can be developed over a single scanning period.

One such fiber-bundle-based scanning endoscope was disclosed by French, et al., in U.S. Patent Application Publication 20110137126, published Jun. 9, 2011. In this system, a synthesized curved wavefront is provided to the input end of a fiber bundle containing thousands of single-mode optical fibers. By controlling this wavefront, the relative phase of the light in each single-mode optical fiber can be made to constructively interfere in a desired manner at the output end of the fiber bundle. Control over this constructive interference enables focusing of the light emerging from the fiber bundle over different points in a three-dimensional volume.

Unfortunately, due in part to the limited number of optical fibers in the fiber bundle, the image quality of such endoscopes is limited. In addition, the relatively large diameter of the fiber bundle (0.5 mm or more) makes them incompatible for insertion into sensitive, confined areas of tissue. As a result, efforts toward reducing the size of these imaging systems have been of great interest.

Di Leonardo, et al., presented a fiber-based imaging system based on a single optical fiber in "Hologram transmission through multi-mode optical fibers," Optics Express, Vol. 19, No. 1, pp. 247-254 (2011). The disclosed imaging system replaced control of the optical modes in each single-mode fiber of a bundle of optical fibers by control over the different optical modes travelling through a solitary multi-mode optical fiber. As a result, the disclosed imaging systems can potentially have a significantly reduced size. Unfortunately, these systems are limited to scanning the output beam of the optical fiber in two dimensions. Further, the reliance of these single-fiber systems on a collimating lens at the output of the optical fiber places an upper bound on which the size of such systems can be reduced.

A small diameter, fiber-based beam scanning system that can scan an output signal in three-dimensions, therefore, remains unrealized in the prior art.

SUMMARY OF THE INVENTION

The present invention enables scanning of an output beam emerging from a multi-mode optical fiber. In some embodiments, the invention enables focusing of the output beam at any point within a three dimensional scan region. Embodiments of the present invention are particularly well suited for applications including imaging, atomic force microscopy, confocal microscopy, optical trapping, sensing, biomarker interrogation, two-dimensional microscopy, three-dimensional microscopy, targeted light delivery for optogenetics and optical communications.

The present invention scans an output beam by controlling the relative phase and/or relative amplitude of a plurality of optical modes propagating through a multimode optical fiber. As the multiple optical modes propagating in the optical fiber emerge from its output facet as the output beam, their relative phase/amplitudes induce interference conditions that direct the output beam over a scan region and, in some embodiments, focus the output beam at any object point within a three-dimensional scan region. By controlling the excitation of the propagating modes, therefore, beam steering using a sole multimode optical fiber is enabled.

In an illustrative embodiment of the present invention, light is reflected from a spatial light modulator (SLM) as a first light signal, which is focused into the input facet of a multimode optical fiber. The SLM comprises a two-dimensional array of reflective pixels that control the excitation of the different modes propagating through the fiber by manipulating the spatial phase distribution of the optical field launched into the input facet of the fiber. In some embodiments, the spatial light modulator also controls the amplitude distribution of the optical field at the input facet of the fiber. In some embodiments, the spatial light modulator controls only the amplitude distribution of the optical field at the input facet of the fiber.

In the illustrative embodiment, an adaptive algorithm is used to enable control of the position of the output beam. In the adaptive algorithm, an objective function is substantially optimized, in sequential fashion, for each pixel of the spatial light modulator. For each pixel, measurements of the objective function are made at three discrete positions of that pixel. These measurements are then used to determine a substantially optimal position for that pixel to position the output beam at its desired location.

In some embodiments, a map of substantially optimal pixel positions corresponding to each object point in the scan region is determined during a calibration operation. During calibration, the objective function comprises a measurement of actual output beam position versus desired output beam position. The objective function is measured via a camera inserted into the system to measure actual output beam position. In operation, the map of pixel positions is used to guide the output beam to any object point in the scan region.

In some embodiments, the objective function comprises a feedback signal from the scan region and the substantially optimal position of each pixel is determined in real time based on the feedback signal.

In some embodiments, two multimode fiber-based scanners operate in concert to enable two-photon excitation of matter located at any of a plurality of object points within a three-dimensional scan region.

In some embodiments, the output facet of the multimode fiber is functionalized to selectively bind with a protein and the SLM controls the propagating modes to enable optical interrogation of the protein-coated facet.

In some embodiments, one or more sensors are optically coupled with the output signal from the multimode fiber to enable optical interrogation of the sensor. In some of these embodiments, the one or more sensors are physically coupled with the output facet of the optical fiber.

In some embodiments, an imaging system having high signal-to-noise ratio comprises a multimode fiber and two SLMs. In such dual-SLM imaging systems, a first of the two SLMs provides the first light signal to the input facet of the multimode fiber to control the focal point of output beam exiting the output facet of the multimode fiber. Light reflected from the scan region is coupled back into the output facet and emerges from the input facet, where it is received by the second of the two SLMs. The second SLM is dimensioned and arranged to selectively optically couple a single object point in the three-dimensional scan region with a photodetector. As a result, the light received by the detector is substantially filtered to include only light reflected by the desired single object point, resulting in a high single-to-noise ratio signal. In some embodiments, a dual-SLM imaging system defines a confocal microscope. In some embodiments, two dual-SLM imaging systems operate in concert to define a confocal microscope, wherein each first SLM is controlled such that the focal point of each output beam is directed at the same object point in a three-dimensional scan region, and wherein each second SLM is controlled to define an object point from which reflected light is detected at a detector.

An embodiment of the present invention is an apparatus comprising: a first optical fiber operable to receive a first light signal at a first input facet and provide a second light signal at a first output facet, the first optical fiber supporting a first plurality of optical modes that collectively define the second light signal; and a first spatial light modulator, the first spatial light modulator being operable to provide the first light signal to the first input facet and control at least one of the relative phase and amplitude of each of the first plurality of optical modes to focus the second light signal at any of a plurality of object points within a three-dimensional region.

BRIEF DESCRIPTION OF THE DRAWINGS

FIG. 8 depicts a schematic drawing of a confocal microscope in accordance with a second alternative embodiment of the present invention.

FIG. 9 depicts a schematic drawing of a sensing system in accordance with a third alternative embodiment of the present invention.

FIG. 10 depicts a schematic drawing of a sensing system in accordance with a fourth alternative embodiment of the present invention.

FIG. 11 and FIG. 12 depict a schematic drawing of a sensing system in accordance with a fifth alternative embodiment of the present invention.

DETAILED DESCRIPTION

Theory of Operation

Figure 1:
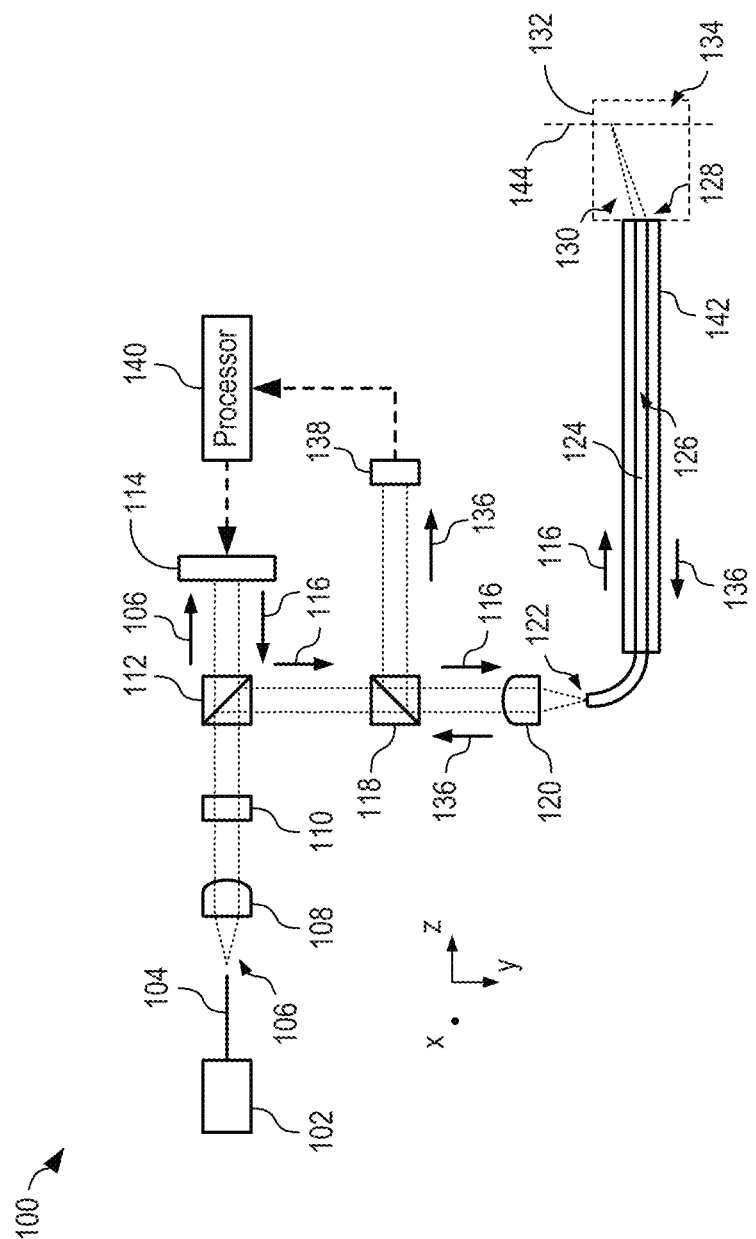
FIG. 1 depicts a schematic diagram of a portion of an imaging system in accordance with an illustrative embodiment of the present invention.

The desired beam shape and focus position for a beam emitted by the output facet of a multimode fiber is dependent upon the specific application for which beam control is desired. In this section, a set of analytical equations is developed, based on an exemplary beam scanning system in accordance with the present invention. One skilled in the art will recognize, however, that this is merely one non-limiting example and that many alternative treatments are possible within the scope of the present invention.

A system in accordance with the present invention focuses light output from a multimode fiber to a focused spot on an axial plane within a three-dimensional scan region by manipulating the spatial phase and/or amplitude profiles of the wavefront of a light signal coupled into the input facet of the fiber.

Although the detailed calculations for generating the focused spot are quite complex and typically require numerical simulations, the analysis provided here employs a simplified treatment based on Gaussian beam propagation to provide an intuitive understanding of the principles of the present invention. Further, this analysis assumes that perfect optical coupling into and out of the fiber.

One skilled in the art will recognize that a multimode fiber can support a number of propagating modes proportional to the square of its V-number, which is given by the expression:

$$V = \frac{2\pi a}{\lambda} NA \quad (1)$$

where NA is the numerical aperture of the fiber, a is the radius of the core of the fiber, and $\lambda$ is the wavelength of light.

In a graded-index multimode fiber (neglecting polarization diversity), the number of supported modes is approximated by:

$$N = \frac{\pi^2 a^2 NA^2}{2\lambda^2}, \quad (2)$$

while the number of supported modes in a step-index multimode fiber is equal to:

$$N = \frac{\pi^2 a^2 NA^2}{\lambda^2}, \quad (3)$$

or approximately double the number of modes supported in a graded-index fiber.

The number of focused spots that can be formed within the axial plane is equal to the ratio of the scan region area at the plane to the area of the focused spot, where the focused spot has a minimum radius, $r_0 \approx 0.16 \lambda/NA$. Assuming the area of the scan region at the plane is substantially equal to the area of the output facet (i.e., equal to $\pi a^2$), the number of focused spots within the axial plane is given by:

$$N_{fs} = \frac{a^2}{r_0^2} \approx \frac{a^2 NA^2}{0.61^2 \lambda^2}. \quad (4)$$

The number of focused spots $N_{fs}$ given by (4) is of the order of N/1.8 for graded-index fiber and N/3.7 for step-index fiber.

It should be noted that spots having radii comparable to $r_0$ can be formed at any axial plane from the output facet up to the Rayleigh range of the modes, which is given by:

$$Z_R = \frac{\pi w_0^2}{\lambda}, \quad (5)$$

where the mode radius, $w_0$, (the radius at which the fundamental mode's intensity decreases by $1/e^2$) is given by:

$$w_0 = \sqrt{\frac{a\lambda}{\pi NA}}. \quad (6)$$

While it is possible to focus beyond the Rayleigh range, the focused beam radius increases rapidly with distance beyond this limit.

The modes can be modeled as Hermite-Gaussian modes of an infinite-core, graded-index multimode fiber propagating in free space at the output of the fiber. As a result, the approximate field is give by:

$$f(x,y,z) = \Sigma_{m,n} c_{mn} TEM_{mn}(x,y,z), \quad (7)$$

where $c_{mn}$ is the complex mode coefficient and $TEM_{mn}$ is the mode electric field.

The mode field equation is given by:

$$TEM_{mn}(x, y, z) = \quad (8)$$

$$\frac{E_o W_o}{w(z)} H_m\left(\sqrt{2}\frac{x}{w(z)}\right) e^{-\frac{x^2}{w(z)^2}} H_n\left(\sqrt{2}\frac{y}{w(z)}\right) e^{-\frac{y^2}{w(z)^2}} P_{mn}(x, y, z),$$

where the phase term is given by:

$$P_{mn}(x, y, z) = e^{-i\left(kz - (1+m+n)\tan^{-1}\left(\frac{z}{z_R}\right) + \frac{k(x^2+y^2)}{2R(z)}\right)}, \quad (9)$$

and the coefficients $C_{mn}$ are given by:

$$c_{mn} = \iint_{-\infty}^{+\infty} f(x,y,z) TEM^*_{mn}(x,y,z). \quad (10)$$

It should be further noted that it is preferable to include the Gouy phase when calculating the synthesized fields, as we have done in (9). For the Hermite-Gaussian modes described above, the Gouy phase is given by:

$$\varphi_{G,mn}(z) = -(m + n + 1)\tan^{-1}\left(\frac{z}{z_R}\right). \quad (11)$$

As the mode phases propagate away from the output facet of the fiber, they will shift relative to each other. As a result, focused spots can be formed in different axial planes.

Axial resolution is approximated by calculating the distance from the focused spot location at which each of the lowest-order and highest-order modes become out of phase by π radians. The maximum value of m−n is equal to $a^2/w^2-1$ and the minimum value is equal to zero. Inserting these values into Eq. (11) yields an axial resolution of:

$$\Delta z = 2 z_R \tan\left(\frac{\pi w^2}{a^2 - w^2}\right). \quad (12)$$

FIG. 1 depicts a schematic diagram of a portion of an imaging system in accordance with an illustrative embodiment of the present invention. Imager 100 comprises laser 102, collimators 108 and 120, linear polarizer 110, beam splitters 112 and 118, SLM 114, fiber 124, power monitor 138, processor 140, and tube 142. Imager 100 is capable of focusing output beam 130 at any object point on any axial plane 144 within scan region 132.

Figure 2:
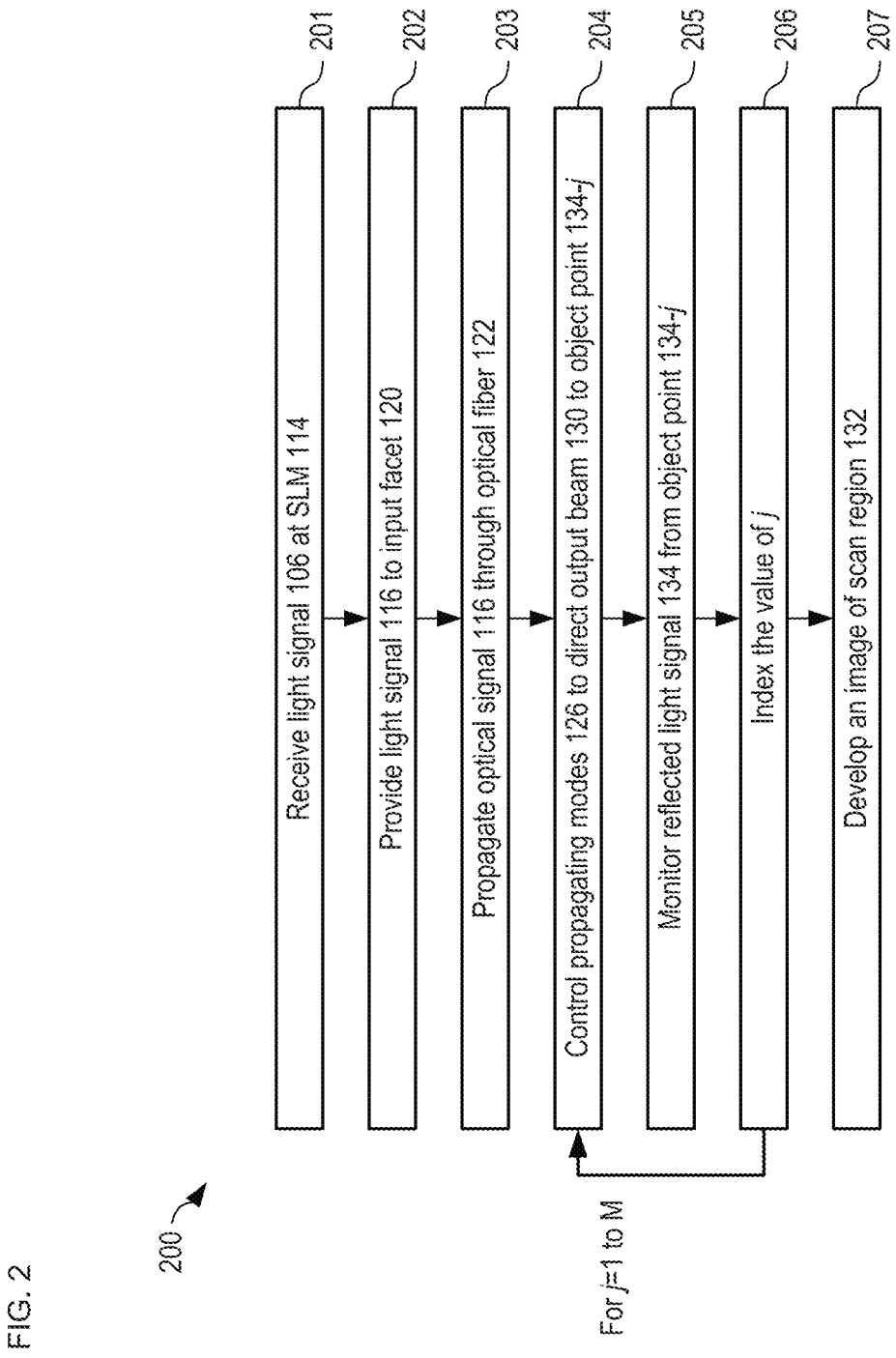
FIG. 2 depicts operations of a method for controlling the focus of a light signal within a three-dimensional region in accordance with the illustrative embodiment of the present invention.

FIG. 2 depicts operations of a method for controlling the focus of a light signal within a three-dimensional region in accordance with the illustrative embodiment of the present invention. Method 200 begins with operation 201, wherein SLM 114 receives light signal 106 from laser 102. Apparatus and methods for scanning an output beam over a three-dimensional scan region in accordance with the present invention are disclosed by: Mahalati, et al., in "Adaptive control of input field to achieve desired output intensity profile in multimode fiber with random mode coupling," *Optics Express*, Vol. 20, No. 13, pp. 14321-14337 (2012); and Boucher, et al., in "Spot formation and scanning microscopy via multimode fibers," *Proceedings of the 2011 IEEE Photonics Conference*, 9-13 Oct. 2011, pp. 713-714; each of which is incorporated herein by reference.

Laser 102 is a conventional laser that emits substantially coherent light at wavelength, λ. In the illustrative embodiment, laser 102 emits light having a wavelength equal to 1550 nm, although one skilled in the art will recognize that the desired value of λ depends on the application for which imager 100 is intended.

Laser 102 is a conventional fiber-coupled laser. Laser 102 provides light signal 106 via polarization-maintaining single-mode output fiber 104.

Collimator 108 receives light signal 106 from output fiber 104 and collimates it in conventional fashion.

Collimated light signal 106 is passed through linear polarizer 110 and beam splitter 112 and received at SLM 114.

Figure 3:
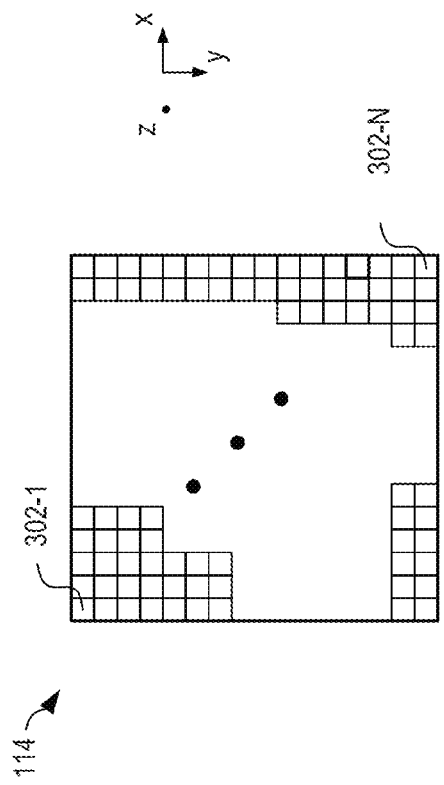
FIG. 3 depicts a plan view of a spatial light modulator in accordance with the illustrative embodiment of the present invention.

FIG. 3 depicts a plan view of a spatial light modulator in accordance with the illustrative embodiment of the present invention. Spatial light modulator 114 comprises a two-dimensional array of N individually addressable pixels—specifically, pixels 302-*i*, where is within the range of 1 to N (referred to, collectively, as pixels 302). Each of pixels 302 is capable of imparting a phase change within the range of 0 to at least 2π on the portion of light signal 106 that is incident upon it. Examples of pixel elements suitable for use in SLM 114 include, without limitation: reflective elements capable of vertical motion (relative to the plane of the SLM), wherein the range of motion of each pixel 302 is at least equal to one full wavelength of light signal 106; liquid-crystal elements capable of imparting a phase change on light incident upon them; and the like.

One skilled in the art will recognize, after reading this Specification, that SLM type (e.g., reflective, transmissive, phase-only SLMs, amplitude-only SLMs, or amplitude-and-phase SLMs, etc.), size, array size, pixel size, and pixel dynamic range of SLM 114 are matters of design choice. As an example, in the illustrative embodiment, spatial light modulator 114 comprises a 256×256 array of pixels 302. In some embodiments, spatial light modulator 114 comprises other than an array of 256×256 pixels and/or has a pixel configuration other than square. In some embodiments, SLM 114 includes pixels that can induce both a phase shift and an amplitude change on light incident upon them. In some embodiments, groups of pixels are controlled collectively, thereby effectively reducing the number of individually addressable pixels in SLM 114.

At operation 202, SLM 114 reflects light signal 106 as light signal 116. Beam splitter 112 receives light signal 116 and redirects it toward collimator 120, which focuses it onto input facet 122 of fiber 124.

Optical fiber 124 is a conventional multimode optical fiber (i.e., it supports the propagation of hundreds to tens of thousands of optical modes between input facet 122 and output facet 128). In some embodiments, input facet 122 and output facet 128 are coated with a conventional anti-reflection coating to reduce back reflections of light signal 116 at these surfaces. In some embodiments, at least one of input facet 122 and output facet 128 is angle polished to reduce back reflections of light signal 116. In some embodiments, optical fiber 124 is a graded-index multimode fiber. In some embodiments, optical fiber 124 is a step-index multimode fiber.

At operation 203, light signal 116 propagates through optical fiber 124 to output facet 128 as modes 126.

At operation 204, SLM 114 controls the relative phases of modes 126. In the illustrative embodiment, the relative phases of modes 126 are controlled by controlling the spatial phase distribution of light signal 116 at input facet 122 to scan output beam 130 over the object points in scan region 132. Scan region 132 comprises a three-dimensional arrangement of M individually addressable object points—specifically, object points 134-*j*, where j is within the range of 1 to M (referred to, collectively, as object points 134). In some embodiments, scan region 132 has a three-dimensional arrangement of object points wherein at least one dimension has a different number of object points than at least one other direction. In some embodiments, scan region is a two-dimensional region having a square, rectangular, or irregular arrangement of object points.

By controlling the spatial phase distribution of light signal 116 at input facet 122, SLM 114 controls the manner in which optical modes 126 are excited in optical fiber 124 and, thus, the relative phases of optical modes 126 at output facet 128. The relative phases of optical modes 126 at output facet 128 result in constructive and destructive interference conditions that collectively act to focus of light beam 130 at any of object points 134 on axial plane 144, which is located within three-dimensional scan region 132. In some embodiments, SLM 114 also controls the spatial amplitude distribution of light signal 116 at input facet 122. In some embodiments, SLM 114 only controls the spatial amplitude distribution of light signal 116 at input facet 122. In some embodiments, SLM 114 is an amplitude-only SLM (e.g., the Texas Instruments Digital Light Processor (DLP)) that is used to control the spatial phase distribution and spatial amplitude distribution of light signal 116 at input facet 122.

It should be noted that, although controlling the spatial phase distribution and/or spatial amplitude distribution of light signal 116 is the preferred way to control the excitation of optical modes 126, such control can be achieved by other methods as well. For example, strain-induced birefringence can be imparted in one or more regions of optical fiber 124 to affect the propagation of optical modes 126 by mechanical clamping of grating structures against the optical fiber, inducing controlled bends, straining one or more portions of the optical fiber, heating one or more portions of the optical fiber, and the like.

Figure 4:
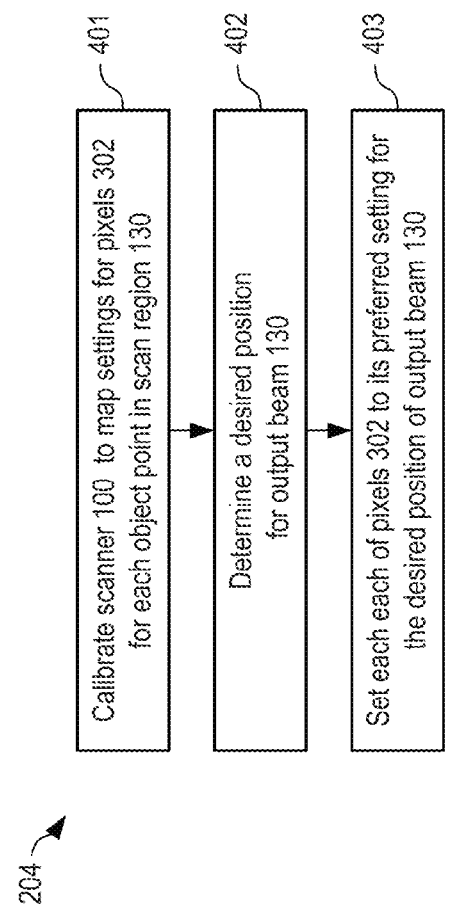
FIG. 4 depicts sub-operations suitable for scanning an output beam over a scan region in accordance with the illustrative embodiment of the present invention.

FIG. 4 depicts sub-operations suitable for scanning an output beam over a scan region in accordance with the illustrative embodiment of the present invention. Operation 204 begins with sub-operation 401, wherein SLM 114 is calibrated to map settings for each of pixels 302 suitable for positioning output beam 130 at each object point 134.

It should be noted that the sub-operations of operation 204 described herein, vis-à-vis the illustrative embodiment, are suitable for operation of scanner 100 under the condition that the locations of object points 134 are known. In some cases, however, imager 100 is used to scan output beam 130 when scan region 132 includes at least one unknown object point. Under this condition, the sub-operations of operation 204 differ from what is described here, as described below.

During calibration of imager 100, a camera is positioned in scan region 132. The camera provides an image of output beam to processor 140, which compares the image of the received output beam with the intended position and size of output beam 130. In some embodiments, the camera comprises a phosphor-coated CCD array.

Processor 140 is a conventional processing system suitable for running programs, determining a value of an objective function for output beam 130, providing control signals to SLM 114, storing a data set for mapping pixel position to output beam position, and developing an image of scan region 132, among other things.

Figure 5:
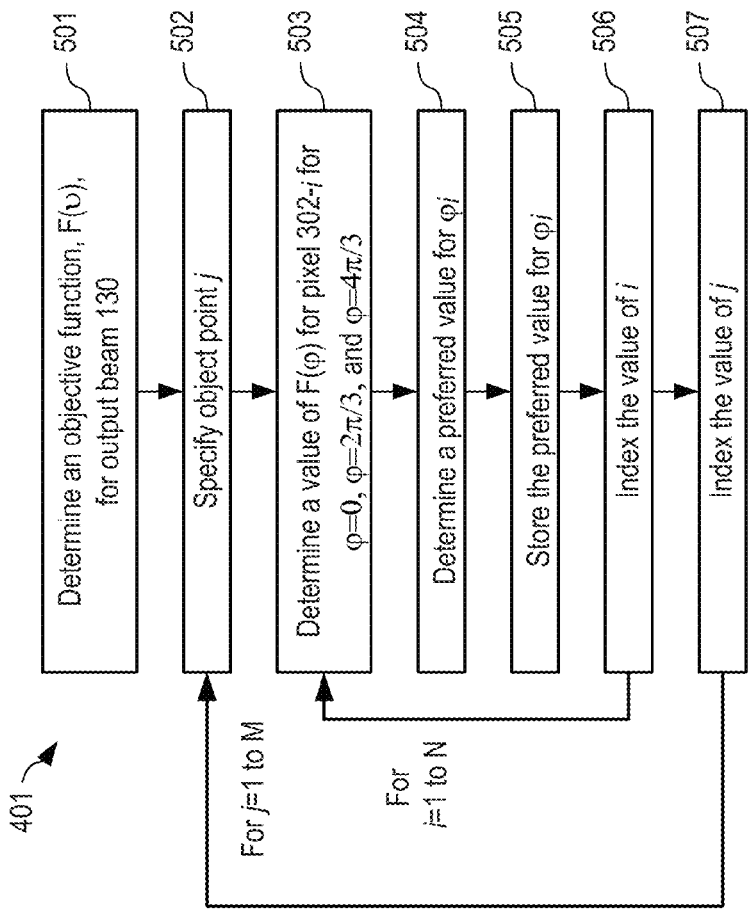
FIG. 5 depicts operations of an SLM calibration procedure in accordance with the illustrative embodiment.

FIG. 5 depicts operations of an SLM calibration procedure in accordance with the illustrative embodiment. Operation 401 begins with sub-operation 501, wherein an objective function for output beam 130 is determined. The objective function is a quality factor for output beam 130 that enables determination of the accuracy of the position of the output beam relative to its desired position. In the illustrative embodiment, an exemplary objective function is a measure of optical power detected within a target circle as compared to the optical power detected outside the target circle.

Figure 6:
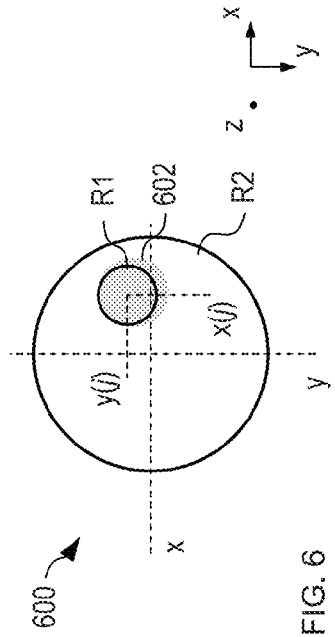
FIG. 6 depicts a schematic representation of detected intensity of an output beam overlaid upon a target circle that denotes the desired position and size of the output beam.

FIG. 6 depicts a schematic representation of detected intensity of an output beam overlaid upon a target circle that denotes the desired position and size of the output beam. Plot 600 denotes region R1, region R2, and spot 602.

Region R1 represents the desired position and distribution of the optical power of output beam 130.

Region R2 represents the total area of the core of fiber 124.

Spot 602 represents the detected optical power of output beam 130.

The objective function determined in operation 501 is selected to substantially maximize the optical power inside the target circle and substantially minimize the optical power outside the target circle. An exemplary objective function is described by:

$$F(\upsilon) = \int\!\!\int_{R2} I_{fiber,out}(x,y)dxdy + \kappa \int\!\!\int_{R1} |I_{fiber,out}(x,y) - I_{des}(x,y)|dxdy, \quad (13)$$

where $I_{fiber,out}(x,y)$ is the intensity distribution of the entire core of fiber 124, $\upsilon$ is the SLM pixel-reflectance, $\upsilon$ is a constant, and $I_{des}(x,y)$ is the desired intensity distribution of output beam 130.

At sub-operation 502, object point 134-$j$ is specified.

SLM 114 is a phase-only SLM; therefore, the value for the reflectance of each pixel 302-$i$ is described by $\upsilon_i = \exp(j\phi_i)$, where $\phi_i$ is the phase of pixel 302-$i$. As a result, equation (13) above has a dependency on the phase of the ith SLM pixel that is described by:

$$F(\phi_i) = a_i \sin \phi_i + b_i \cos \phi_i + c_i, \quad (14)$$

where $a_i$, $b_i$, and $c_i$ are three constants that can be uniquely determined from measurements of the objective function for each pixel 302-$i$ while the pixel has phases $\phi_i=0$, $\phi_i=2\pi/3$, and $\phi_i=4\pi/3$. These measurements define $F_{i,1}=F(\phi_i=0)$, $F_{i,2}=F(\phi_i=2\pi/3)$, and $F_{i,3}=F(\phi_i=4\pi/3)$.

At sub-operation 503, a value for the objective function is determined for pixel 302-$i$ for the pixel set to each of phases $\phi_i=0$, $\phi_i=2\pi/3$, and $\phi_i=4\pi/3$.

At sub-operation 504, a preferred value for the phase of pixel 302-$i$ is determined for object point 134-$j$. The values of $a_i$, $b_i$, and $c_i$ are determined as:

$$\begin{bmatrix} a_i \\ b_i \\ c_i \end{bmatrix} = \begin{bmatrix} 0 & 1 & 1 \\ \sqrt{3}/2 & -1/2 & 1 \\ -\sqrt{3}/2 & -1/2 & 1 \end{bmatrix}^{-1} \begin{bmatrix} F_{i,1} \\ F_{i,2} \\ F_{i,3} \end{bmatrix}. \quad (15)$$

Defining $\phi_i^* = \tan^{-1}(a_i/b_i)$, the preferred value of $\phi_i$ (i.e., $\phi_i$) is equal to $\phi_i^*$ if $a_i \sin \phi_i^* + b_i \cos \phi_i^* < 0$. If $a_i \sin \phi_i^* + b_i \cos \phi_i^* \geq 0$, then the preferred value of $\phi_i$ is equal to $\phi_i^* + \pi$.

At sub-operation 505, the preferred value for $\phi_i$ (i.e., $\phi_{i,p}$) is stored in memory that is accessible for processor 140.

At sub-operation 506, the value of i is indexed.

At sub-operation 507, the value of j is indexed.

It should be noted that in the case of an SLM that is an amplitude-and-phase SLM, the reflectivity of each pixel 302-$i$ is described by $\upsilon_i = r_i \exp(j\phi_i)$, where $r_i$ is the amplitude of pixel 302-$i$. In such cases, equation (13) above has a dependency on the amplitude and phase of the ith SLM pixel described by:

$$F(r_i, \phi_i) = d_i r_i^2 + a_i r_i \sin \phi_i + b_i R_i \cos \phi_i + c_i, \quad (16)$$

where $a_i$, $b_1$, $c_i$ and $d_i$ are determined from measurements of the objective function for each pixel 302-$i$ while the pixel is set to 0, 1, $\exp(j2\pi/3)$, and $\exp(j4\pi/3)$. These measurements define $F_{i,1}=F(\upsilon_i=0)$, $F_{i,2}=F(\upsilon_i=2\pi/3)$, $F_{i,3}=F(\upsilon_i=\exp(j2\pi/3))$, and $F_{i,4}=F(\upsilon_i=\exp(j4\pi/3))$, which provides the values of $a_i$, $b_1$, $c_i$ and $d_i$ as:

$$c_i = F_i, 1; \text{ and} \quad (17)$$

$$\begin{bmatrix} d_i \\ a_i \\ b_i \end{bmatrix} = \begin{bmatrix} 1 & 0 & 1 \\ 1 & \sqrt{3}/2 & -1/2 \\ 1 & -\sqrt{3}/2 & -1/2 \end{bmatrix}^{-1} \begin{bmatrix} F_{i,2} - F_{i,1} \\ F_{i,3} - F_{i,1} \\ F_{i,4} - F_{i,1} \end{bmatrix}.$$

Again defining $\phi_i^* = \tan^{-1}(a_i/b_i)$, when $d_i \geq 0$, the preferred value of $\phi_i$ (i.e., $\phi_{i,p}$) is again equal to $\phi_i^*$ if $a_i \sin \phi_i^* + b_i \cos \phi_i^* < 0$ and $\phi_i^* + \pi$ if $a_i \sin \phi_i^* + b_i \cos \phi_i^* 0$. The preferred value of $r_i$ (i.e., $r_{i,p}$), is equal to $(-a_i \sin \phi_{i,p} - b_i \cos \phi_{i,p})/2d_i$. When $d<0$, however:

$r_{i,p}=1, \phi_{i,p}=\phi_i$ if $d_i + a_i \sin \phi_i^* + b_i \cos \phi_i^* < 0$;

$r_{i,p}=1, \phi_{i,p}=\phi_i^* + \pi$ if $d_i - a_i \sin \phi_i^* - b_i \cos \phi_i^* < 0$; and $r_{i,p}=0$ otherwise.

In such embodiments, at sub-operation 505, the preferred value for pixel reflectivity, $\upsilon_i = r_{i,p} \exp(j\phi_{i,p})$ is stored rather than the preferred value for pixel reflectance, $\phi_{i,p}$.

Returning now to operation 204 of method 200 and FIGS. 1-4, at sub-operation 402 of operation 204, a desired position for output beam 130 is determined.

One skilled in the art will recognize that the determination of the desired position for output beam 130 is dependent upon the application for which imager 100 is used. In the illustrative embodiment, for example, each object point in scan region 132 is interrogated sequentially by repeatedly indexing to the next adjacent object point 134 until all object points in the scan region have been interrogated.

One skilled in the art will also recognize that in some imaging applications, as well as some non-imaging applications, any discrete object point 134 can be selected for interrogation in sub-operation 402.

At sub-operation 403, processor sets each pixel 302 to its preferred phase based on the data stored in memory during calibration operation 401 and the desired position of output beam 130.

Returning now to method 200, at operation 205, the power level of reflected light signal 136 from object point 134-*j* is determined at power monitor 138, which provides it to processor 140.

At operation 206, the value of j is indexed to move output beam 130 to the next adjacent object point in scan region 132.

Operations 204 through 206 are repeated as necessary to determine a value for reflected power from each of object points 134.

One skilled in the art will recognize that any number of suitable patterns can be used to scan output beam 130 through scan region 132 so as to interrogate each of object points 134. The simple scanning pattern described in the illustrative embodiment, for example, scans output beam 130 sequentially across each row of object points in a plane. Upon completion of a row, output beam 130 is indexed to the next adjacent row of object points. The object points in this next row are scanned in the same manner, and so on. Upon completion of a scan of a first axial plane of object points, the output beam is scanned across the next adjacent axial plane in scan region 132. In this way, all object points 134 in scan region 132 are interrogated once during each complete scan of the scan region.

At operation 207, processor 140 develops an image of scan region 132 based on the reflected light signal 136 from each of object points 134.

In the illustrative embodiment, fiber 124 is optionally enclosed in tube 142, which improves its structural rigidity and robustness, and which facilitates tissue penetration. One skilled in the art will recognize that changes in the configuration of fiber 124 (e.g., changes in bending, etc.) can affect the propagation characteristics of modes 126 and, therefore, the control of output signal 130 by SLM 114. The addition of tube 142 mitigates these changes. Further, temperature changes can also affect the propagation characteristics of modes 126. The addition of tube 142 increases the thermal capacity of the imager, mitigating the affect of external temperature on mode propagation. In some embodiments, heating/cooling elements capable of stabilizing the temperature of tube 142 and/or fiber 124 are also included in the system.

In some embodiments, tube 142 is formed such that it has a high numerical aperture, which enables second harmonic imaging.

In some embodiments, imager 100 is used to scan output beam to at least one unknown object point in scan region 132. In some such embodiments, the system cannot be calibrated prior to use. Instead, a feedback signal reflected from scan region 132 back into output facet 128 is monitored and each pixel 302 is substantially optimized based on an objective function corresponding to this feedback signal. In some applications, the objective function is the intensity of a fluorescence signal emitted by a fluorophore within scan region 132. In some applications, the objective function is the optical power of reflected light signal 136. It will be clear to one skilled in the art, after reading this Specification, how to determine a suitable feedback signal and objective function based on the application for which imager 100 is used.

An example of an application wherein output beam 130 is scanned to illuminate an object at an unknown object point, consider the delivery of light to fluorophores at unknown locations. In such a case, the desired intensity profile is not known a priori. In this example, a test object containing fluorophores is placed in scan region 132, and reflected light signal 136 is the fluorescence signal returned by a fluorophore. In this case, the objective function, which is based on the intensity of reflected light signal 136, is described by:

$$F(\upsilon) = -\kappa \iint_{R2} I_{fiber,out}^n(x, y) P(x, y) dx dy, \tag{18}$$

where $\kappa$ is a positive constant describing the fluorescence efficiency and $P(x,y)$ is the unknown density distribution of the fluorophores(s), and varies from 0 to 1. The parameter n is set to 1 for single-photon fluorescence and 2 for two-photon fluorescence. The integral is carried over the whole core area of fiber 124. Equation (18) has the same dependence on the phase of the ith SLM pixel (i.e., 302-*i*) as described above in equation (2). For SLM pixels that control both amplitude and phase, equation (18) has the same dependence on the phase of the ith SLM pixel (i.e., 302-*i*) as described above in equation (4).

Figure 7:
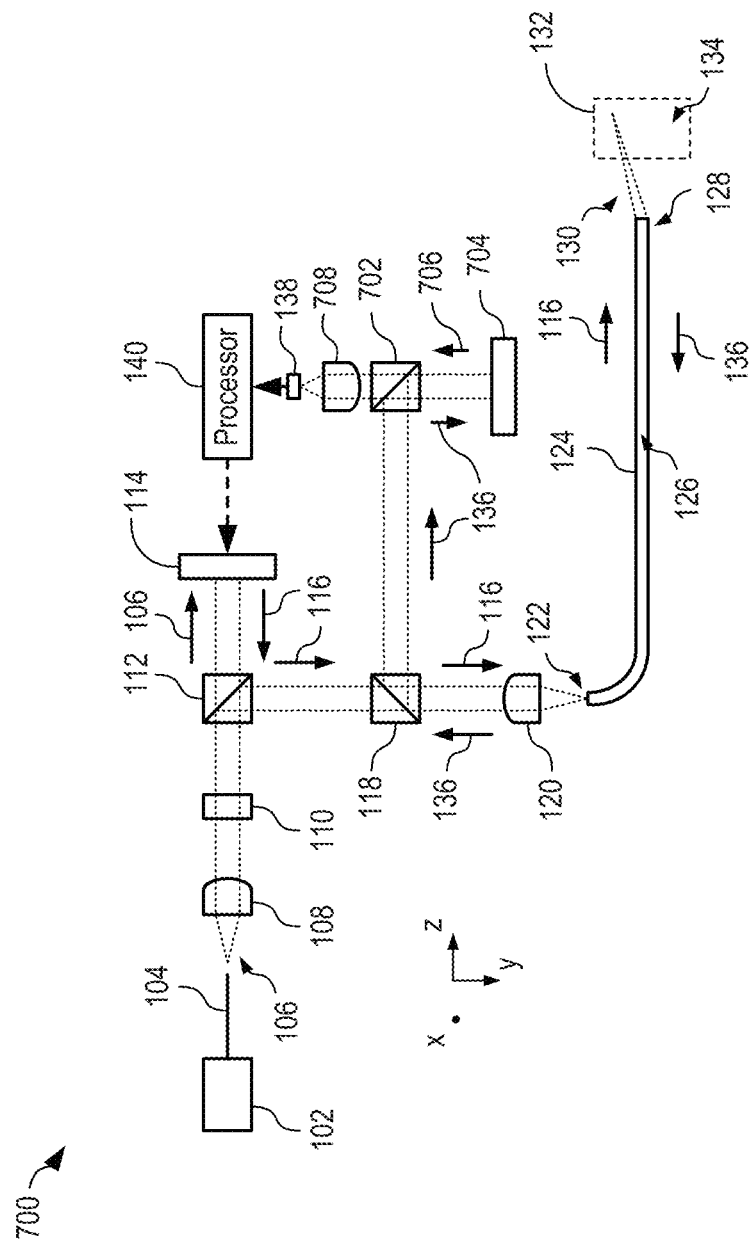
FIG. 7 depicts a schematic drawing of an imager having high signal-to-noise ratio in accordance with a first alternative embodiment of the present invention.

FIG. 7 depicts a schematic drawing of an imager having high signal-to-noise ratio in accordance with a first alternative embodiment of the present invention. Imager 700 comprises imager 100, beam splitter 702, SLM 704, and lens 708.

Beam splitter 702 and SLM 704 are positioned in the optical path of reflected light signal 136 prior to power monitor 138.

Beam splitter 702 redirects reflected light signal 136 to SLM 704.

SLM 704 is analogous to SLM 114. In operation, SLM 704 reflects reflected light signal 136 as light signal 706, which is focused onto power monitor 138 by lens 708. In addition to reflecting it, SLM 704 also manipulates the spatial phase configuration of reflected light signal 136 to selectively pass light from a specific object point in scan region 134 to power monitor 138. In other words, SLM 704 suppresses the passage of light from object points other than the object point being imaged, such as object points in the path of output beam 130 as it interrogates an object point deep within scan region 132. As a result, imager 700 is capable of attaining a significantly higher signal-to-noise ratio than imager 100. One skilled in the art will recognize that, in some embodiments, it is advantageous to include a spatial filter, such as an aperture, pinhole, or spatial light modulator in the optical path between beam splitter 702 and power monitor 138.

It should be noted that in each of the embodiments of the present invention described thus far control of optical modes 126 to produce a focused output beam that is scanned through a scan region on an object-point-by-object-point basis. Pointby-point interrogation of scan region 132 can be realized using a relatively simple sampling function, as illustrated in the following example.

FIG. 8 depicts a portion of a scan region comprising four discrete object points. Scan region 800 includes object points 134-1 through 134-4, which are arranged in a 2×2 planar array.

In order to sample each object point in scan region 800, output beam 130 can be sequentially scanned to sequentially interrogate each object point using four sampling functions A-D, written as: A=1000, B=0100, C=0010, and D=0001. This enables straight-forward reconstruction of an image of scan region 800 by linking the reflected intensity for sampling function A to object point 134-1, the reflected intensity for sampling function B to object point 134-2, the reflected intensity for sampling function C to object point 134-3, and the reflected intensity for sampling function D to object point 134-4.

It is an aspect of the present invention, however, that the propagating modes can be controlled to realize any of a variety of desired output beam shapes and arrangements. In other words, controlling the excitation of propagating modes 126 enables control over the complex field pattern of output beam 130. Once this complex field pattern is known, it is possible to find the complex coefficients to apply to scan region 132 to reconstruct an image of the scan region. These coefficients can be determined by computing an overlap integral of the output field for each object point to determine an integrated intensity for that object point. To reconstruct an object point in the image, the integrated intensities are added and multiplied by the correct coefficient to obtain a magnitude for the reflected intensity from that object point. It should be noted that for reconstruction of a three-dimensional scan region, the complex field must be determined at each axial location. As described above, and with respect to FIG. 7, by filtering the reflected signal that returns from the input facet with a spatial filter (e.g., a second SLM), signal-to-noise ratio in the image can be improved.

For example, the object points of scan region 800 can also be interrogated with sampling functions E-H, written as: E=0111, F=1011, G=1101, and H=1110. Reconstruction of the image of scan region 800 can then be accomplished by giving object point 134-1 the reflected intensity of sampling functions F, G, and H and subtracting twice the intensity of sampling function E, object point 134-2 the reflected intensity of sampling functions E, G, and H and subtracting twice the intensity of sampling function F, object point 134-3 the reflected intensity of sampling functions E, F, and H and subtracting twice the intensity of sampling function G, and object point 134-4 the reflected intensity of sampling functions E, F, and G and subtracting twice the intensity of sampling function H.

It should be noted that, in accordance with the present invention, it is possible to interrogate the object points of any scan region using any set of linearly independent sampling functions.

It should also be noted that control of optical modes 126 enables control over the shape and propagation directions of different portion of output beam 130. As a result, output beam 130 can have multiple beams directed at different object points (e.g., to interrogate a plurality of object points simultaneously), multiple beams directed at the same object point (e.g., to realize two-photon excitation of an object point), and the like.

FIG. 9 depicts a schematic drawing of a confocal microscope in accordance with a second alternative embodiment of the present invention. Microscope 900 comprises imagers 100A and 100B. In some embodiments, imagers 100A and 100B share processor 140.

Imagers 100A and 100B provide output beams 130A and 130B, which are coordinated to simultaneously sequentially scan each object point 134-$j$ (where j=1 to M) within scan region 132. As a result, microscope 900 enables the reconstruction of three-dimensional structures their respective scanned images.

It should be noted that the optical system of confocal microscope 900 also enables its use in other applications, such as optical trapping, two-photon excitation, and the like.

FIG. 10 depicts a schematic drawing of a sensing system in accordance with a third alternative embodiment of the present invention. Sensing system 1000 comprises imager 100 and functionalized layer 1002.

Functionalized layer 1002 is a layer that is functionalized to bind with one or more specific biological components, such as DNA strands, proteins, and the like. Functionalized layer 1002 is disposed on output facet 128. Scan region 1004 is analogous to scan region 132; however, scan region 1004 includes output facet 128 and functionalized layer 1002. Because scan region 1004 is substantially two-dimensional, SLM 114 needs to control output beam 130 only within the two-dimensional plane defined by functionalized layer 1002.

FIG. 11 depicts a schematic drawing of a sensing system in accordance with a fourth alternative embodiment of the present invention. Sensing system 1100 comprises the beam scanning portion of imager 100 and sensor array 1104, which includes sensors 1102-1 through 1102-3. Although the fourth alternative embodiment of the present invention comprises three sensors, it will be clear to one skilled in the art, after reading this Specification, how to specify, make, and use alternative embodiments of the present invention that comprises any practical number of sensors.

Each of sensors 1102-1 through 1102-3 is an optically addressable device sensitive to a different stimulus, such as presence of a specific chemical or biological component, temperature, acceleration, Ph, conductivity, magnetic field, voltage, pressure, and the like. Each of sensors 1102-1 through 1102-3 is disposed on output facet 128. Scan region 1104 is analogous to scan region 132; however, scan region 1104 includes at least a portion of each of sensors 1102-1 through 1102-3. Because, in some embodiments, scan region 1104 is substantially two-dimensional, in these embodiments, SLM 114 needs to control output beam 130 only within this two-dimensional plane.

By disposing sensors 1102-1 through 1102-3 on output facet 128, the sensing of different variables simultaneously is enabled. This enables fast scanning of the multiple sensors, multiplexing, imaging of the sensors, etc., with their responses uncoupled from environmental effects, such as temperature or pressure changes, and the like.

FIG. 12 depicts a schematic drawing of a sensing system in accordance with a fifth alternative embodiment of the present invention. Sensing system 1200 comprises the beam scanning portion of imager 100 and sensor array 1202, which includes sensors 1102-1 through 1102-3. Although the fifth alternative embodiment of the present invention comprises three sensors, it will be clear to one skilled in the art, after reading this Specification, how to specify, make, and use alternative embodiments of the present invention that comprises any practical number of sensors.

In sensing system 1200, sensors 1102-1 through 1102-3 are arranged in a three-dimensional arrangement; however, they can still be quickly optically interrogated via control of output beam 130 by SLM 114.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An apparatus comprising:
a first optical fiber operative for receiving a first light signal at a first input facet and providing a second light signal at a first output facet, the first optical fiber supporting a first plurality of optical modes that collectively define the second light signal;
a first spatial light modulator, the first spatial light modulator being operative for providing the first light signal to the first input facet and controlling at least one of the relative phase and relative amplitude of each of the first plurality of optical modes to control the shape of the second light signal and direct the second light signal to at least one of a plurality of object points within a scan region;
a second spatial light modulator, the second spatial light modulator being operative for receiving a third light signal from the first input facet and providing a fourth light signal, wherein the third light signal comprises light reflected from the scan region into the first output facet, and wherein the second spatial light modulator is operative for manipulating the phase configuration of the third light signal to selectively pass light from one of the plurality of object points to a power monitor; and
a first sensor located within the scan region, wherein the first sensor provides a first sensor signal when the second light signal is incident on it.

2. The apparatus of claim 1 wherein the first spatial light modulator is operative for controlling the at least one of the relative phase and relative amplitude of each of the first plurality of optical modes to focus the second light signal at any of the plurality of object points within the scan region.

3. The apparatus of claim 1 wherein the first spatial light modulator is operative for controlling the at least one of the relative phase and relative amplitude of each of the first plurality of optical modes to shape the second light signal such that it comprises a plurality of regions, each of the regions being simultaneously directed at a different one of the plurality of object points within the scan region.

4. The apparatus of claim 1 wherein the first sensor is mounted on the first output facet, and wherein the scan region includes the output facet.

5. The apparatus of claim 1 wherein the first output facet is functionalized to selectively bind with a biological component, and wherein the scan region includes the output facet.

6. The apparatus of claim 1 further comprising an atomic-force-microscope tip that is physically coupled with the first output facet, the atomic-force-microscope tip being within the scan region.

7. The apparatus of claim 1 further comprising:
a second optical fiber operative for receiving a fifth light signal at a second input facet and providing a sixth light signal at a second output facet, the second optical fiber supporting a second plurality of optical modes that collectively define the fourth sixth light signal; and
a third spatial light modulator, the third spatial light modulator being operative for providing the fifth light signal to the second input facet and controlling at least one of the relative phase and relative amplitude of each of the second plurality of optical modes to focus the sixth light signal at any of the plurality of object points within the scan region.

8. A method comprising:
coupling a first light signal into a first input facet of a first optical fiber, the first optical fiber supporting a first plurality of optical modes that collectively define a second light signal at a first output facet of the first optical fiber;
controlling at least one of the relative phase and relative amplitude of each of the first plurality of optical modes to control the shape of the second light signal and direct it to at least one of a plurality of object points within a scan region;
receiving a third light signal at the first output facet, the third light signal being based on a portion of the second light signal that is reflected by at least a first object point of the plurality of object points;
providing a fourth light signal from the first input facet, the fourth light signal being based on the third light signal; and
controlling at least one of the relative phase and relative amplitude of the fourth light signal to selectively include the portion of the second light signal that is reflected by the first object point in the fourth light signal.

9. The method of claim 8 wherein the at least one of the relative phase and relative amplitude of each of the first plurality of optical modes is controlled to focus the second light signal at any of the plurality of object points within the scan region.

10. The method of claim 8 wherein the at least one of the relative phase and relative amplitude of each of the first plurality of optical modes to focus the second light signal is controlled to shape the second light signal such that it comprises a plurality of regions, each of the regions being simultaneously directed at a different one of the plurality of object points within the scan region.

11. The method of claim 8 further comprising:
coupling a fifth light signal into a second input facet of a second optical fiber, the second optical fiber supporting a second plurality of optical modes that collectively define a sixth light signal at a second output facet of the second optical fiber; and
controlling at least one of the relative phase and relative amplitude of each of the second plurality of optical modes to focus the sixth light signal at any of the plurality of object points within the scan region.

12. The method of claim 11 further comprising controlling each of the first plurality of optical modes and the second plurality of optical modes such that second light signal and the sixth light signal are focused at the same object point of the plurality of object points.

13. The method of claim 8 further comprising:
providing a first sensor, the first sensor being disposed at a first object point within a first region of the first output facet; and
controlling the first plurality of optical modes to direct the second light signal to the first object point.

14. The method of claim 8 further comprising:
providing a probe whose position relative to the output facet is based on an atomic force; and
controlling the at least one of the relative phase and amplitude of each of the first plurality of optical modes to track the position of the probe with the second light signal.

15. The method of claim 8 further comprising:
providing the output facet such that it is functionalized to bind a first biological component; and
optically interrogating the output facet with the second light signal, the output facet being with the scan region.

16. The method of claim 8 wherein the relative phase of each of the first plurality of optical modes is controlled by operations comprising:
- determining an objective function for the second light signal;
- receiving a third light signal at a first spatial light modulator, the first spatial light modulator comprising a plurality of pixels; and
- controlling the phase position of each of the plurality of pixels based on the objective function.

17. A method comprising:
- providing a first light signal from a spatial light modulator, the spatial light modulator comprising a plurality of pixels;
- controlling at least one of the phase position and reflectivity of at least one of the plurality of pixels to control at least one of the spatial phase distribution and spatial optical field intensity distribution in the first light signal;
- coupling the first light signal into a first input facet of a first optical fiber, the first optical fiber supporting a first plurality of optical modes that collectively define a second light signal at a first output facet of the first optical fiber;
- controlling the shape of the second light signal and directing it to at least one of a plurality of object points within a scan region, wherein the shape and direction of the second light signal are based on the at least one of the spatial phase distribution and spatial optical field intensity distribution in the first light signal;
- receiving a third light signal at the first output facet, the third light signal including a portion of the second light signal that is reflected by a first object point of the plurality of object points;
- providing a fourth light signal from the first input facet, the fourth light signal being based on the third light signal; and
- controlling at least one of the relative phase and relative amplitude of the fourth light signal such that it contains only light reflected by the first object point.

* * * * *